Figure 1:
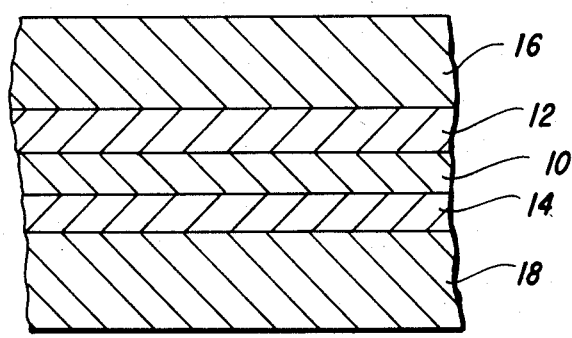

United States Patent [19]

Shah

[11] Patent Number: 4,724,185
[45] Date of Patent: Feb. 9, 1988

[54] OXYGEN BARRIER ORIENTED FILM

[75] Inventor: Gautam P. Shah, Simpsonville, S.C.

[73] Assignee: W. R. Grace & Co., Cryovac Div., Duncan, S.C.

[21] Appl. No.: 776,740

[22] Filed: Sep. 17, 1985

[51] Int. Cl.[4] ............................................. B32B 27/08
[52] U.S. Cl. ........................................ 428/339; 428/35;
428/349; 428/475.8; 428/476.1; 428/516;
428/910; 264/288.4; 156/244.11
[58] Field of Search ................. 428/35, 516, 349, 910,
428/339, 332, 475.8, 476.1; 264/288.4;
156/244.11

[56] References Cited

U.S. PATENT DOCUMENTS

| | | | |
|---|---|---|---|
| 4,064,296 | 12/1977 | Bornstein et al. | 428/35 |
| 4,347,332 | 8/1982 | Odorzynski et al. | 524/169 |
| 4,400,428 | 8/1983 | Rosenthal et al. | 428/349 |
| 4,457,960 | 3/1984 | Newsome | 428/35 |
| 4,464,443 | 8/1984 | Farrell et al. | 428/688 |
| 4,495,249 | 1/1985 | Ohya et al. | 428/516 |
| 4,501,797 | 2/1985 | Super et al. | 428/349 |
| 4,501,798 | 2/1985 | Koschak et al. | 428/349 |
| 4,511,610 | 4/1985 | Yazaki et al. | 428/35 |
| 4,514,465 | 4/1985 | Schoenberg | 428/399 |
| 4,557,780 | 12/1985 | Newsome et al. | 156/244.11 |

FOREIGN PATENT DOCUMENTS 0141555 5/1985 European Pat. Off. .
0149321 7/1986 European Pat. Off. .
2139948a 11/1984 United Kingdom .

OTHER PUBLICATIONS

Summary sheet of three field tests, and copies of field trip reports.
COEX '85, Princeton, New Jersey, USA, Oct. 1985.

Primary Examiner—Edith Buffalow
Attorney, Agent, or Firm—John J. Toney; William D. Lee, Jr.; Mark B. Quatt

[57] ABSTRACT

A coextruded multiple layer oriented film comprises a core layer of a blend of ethylene vinyl alcohol copolymer and polyamide, two intermediate adhesive layers, and two outer layers of a blend of linear low density polyethylene, linear medium density polyethylene, and ethylene vinyl acetate copolymer. A preferred embodiment of the multilayer film exhibits excellent optics and shrink properties while providing high oxygen barrier especially useful in food packaging applications.

16 Claims, 1 Drawing Figure

OXYGEN BARRIER ORIENTED FILM

BACKGROUND OF THE INVENTION

This invention relates to oriented thermoplastic films for packaging; and more particularly, this invention relates to a coextruded, multilayer, oriented film having high oxygen barrier characteristics.

Thermoplastic film, and in particular polyolefin materials, have been used for some time in connection with packaging of various articles including food products which require protection from the environment, an attractive appearance, and resistance to abuse during the storage and distribution cycle. Suitable optical properties are also desirable in order to provide for inspection of the packaged product after packaging, in the distribution chain, and ultimately at point of sale. Optical properties such as high gloss, high clarity, and low haze characteristics contribute to an aesthetically attractive packaging material and packaged product to enhance the consumer appeal of the product. Various polymeric materials have been used to provide lower gas permeability in order to reduce the transmission of oxygen through the packaging film and thereby retard the spoilage and extend the shelf life of products such as food items which are sensitive to oxygen.

It is also desirable to include in a packaging film a shrink feature, i.e., the propensity of the film upon exposure to heat to shrink or, if restrained, create shrink tension within the packaging film. This property is imparted to the film by orientation of the film during its manufacture. Typically, the manufactured film is stretched in either a longitudinal (machine) direction, a transverse direction, or both, in varying degrees to impart a certain degree of shrinkability in the film upon subsequent heating. After being so stretched, the film is rapidly cooled to provide this latent shrinkability to the resulting film. One advantage of shrinkable film is the tight, smooth appearance of the wrapped product that results, providing an aesthetic package as well as protecting the packaged product from environmental abuse. Various food and non-food items may be and have been packaged in shrinkable films.

It is sometimes also desirable to orient the packaging film and thereafter heat set the film by bringing the film to a temperature near its orientation temperature. This produces a film with substantially less shrinkability, while retaining much of the advantages of orientation, including improved modulus and optical properties.

Ethylene vinyl alcohol copolymer (EVOH) is known as an oxygen barrier material and has been used in the past in conjunction with multilayer packaging films. EVOH also provides a good barrier to odors or fragrances. Orienting EVOH to produce a heat shrinkable film has proven to be difficult. During the stretching or racking step for orienting such a film, the EVOH can sometimes develop voids. This phenomenon can result in some loss of oxygen barrier properties, which can affect, i.e. reduce the effective shelf life of food products packaged in EVOH film.

The presence of voids in the EVOH layer can also result in discoloration of a food product, such as processed meat, and therefore reduce the appearance and market value of a packaged food item.

U.S. Pat. No. 4,064,296 issued to Bornstein et al discloses a film formed by the coextrusion of hydrolyzed vinyl acetate (HEVA) with outside layers of, for example, ethylene vinyl acetate copolymer (EVA).

Also of interest is U.S. Pat. No. 4,464,443 issued to Farrell et al showing the use of EVOH in a multilayer polymer structure, and including drying agents or desiccants such as sodium phosphate-di-basic and calcium chloride. EVOH, although a good barrier material, is moisture sensitive, and loses a great deal of its barrier properties at higher levels of relative humidity.

Also of interest is U.S. Pat. No. 4,457,960 issued to Newsome which discloses the use of EVOH and EVOH blends in a multiple layer film. The film may be made as shrinkable film, and may be melt extruded. The outside layer of the multiple layer film may be a blend of linear low density polyethylene (LLDPE) and EVA.

Also of interest is U.S. Pat. No. 4,495,249 issued to Ohya et al and disclosing a multilayer laminate film with a core layer of a saponified copolymer of ethylene and vinyl acetate, and including two outer layers of a mixture of EVA and LLDPE. The multilayer laminate film of this reference can be made heat shrinkable and has gas barrier properties.

U.S. Pat. No. 4,501,797 issued to Super et al discloses an unbalanced oriented multiple layer film including an intermediate layer of anhydride modified polypropylene and a barrier layer of a blend of ethylene vinyl alcohol and nylon.

U.S. Pat. No. 4,501,798 issued to Koschak et al also discloses the use of a blend of EVOH and nylon and an unbalanced multiple layer polymeric film also including LLDPE or EVA in a sealant layer. Adhesive layers of materials having carboxy moieties and preferably anhydride derivatives are present. The film of the reference is characterized by having high barrier to gaseous transmission, high gloss, transparency and stiffness.

U.S. Pat. No. 4,347,332 issued to Odorzynski et al discloses a film having a blend of nylon and ethylene vinyl alcohol copolymer.

U.S. Pat. No. 4,514,465 issued to Schoenberg discloses a five layered thermoplastic film, oriented and irradiated, having a three component blend of LLDPE, LMDPE, and EVA, and a four component surface layer having LLDPE, LMDPE, and EVA combined with a UV stabilizer.

Copending U.S. application Ser. No. 694,362, assigned to a common assignee with the present application, discloses a five-layer thermoplastic film having two cross-linked surface layers of LLDPE/LMDPE/EVA.

It is an object of the present invention to provide a coextruded thermoplastic multilayer film characterized by good oxygen barrier properties over a wide range of moisture conditions.

It is also an object of the present invention to provide a coextruded thermoplastic multilayer film which is substantially free of voids in the barrier material of the film.

It is a further object of the present invention to provide a thermoplastic multilayer film having an aesthetic appearance with good clarity, and other desirable optical properties.

It is another object of the present invention to provide a thin thermoplastic multilayer film having superior toughness and abrasion resistance.

It is still another object of the present invention to provide a coextruded thermoplastic multilayer film which may be totally coextruded, and oriented to provide a film with good shrink properties and good barrier properties over a wide range of moisture conditions.

It is a yet another object of the present invention to provide a coextruded thermoplastic film which is oriented yet substantially shrink free.

SUMMARY OF THE INVENTION

The present invention relates to an oriented multilayer film comprising a cross-linked core layer comprising a blend of an ethylene vinyl alcohol copolymer and a polyamide resin; two cross-linked interior layers each comprising an adhesive resin; and two cross-linked surface layers each comprising a three component blend of a linear low density polyethylene, a linear medium polyethylene, and an ethylene vinyl acetate copolymer.

In another aspect of the invention, a method of making an oriented multilayer film comprises the steps of simultaneously coextruding a core layer of a blend of an ethylene vinyl alcohol copolymer and a polyamide resin, two intermediate layers of an adhesive material, and two outer layers of a blend of a linear low density polyethylene, a linear medium density polyethylene, and an ethylene vinyl acetate copolymer; rapidly cooling the coextruded film; collapsing the cooled film; heating the collapsed film to a temperature between about 105° C. and 115° C.; and stretching and orienting the heated film.

DEFINITIONS

"Intermediate layer", "interior layer", and the like is used herein to define a layer in a multilayer film enclosed on both sides by other layers.

The term "oriented" and the like is used herein to define a polymeric material in which the molecules have been aligned by a process such as racking or blown bubble process.

The term "ethylene vinyl alcohol copolymer", "EVOH", and the like is used herein to include saponified or hydrolyzed ethylene vinyl acetate copolymers.

The term "racking" is used herein to define a well-known process for stretching coextruded and reheated multilayer film by means of tenter framing or blown bubble processes.

The term "linear low density polyethylene", "LLDPE", and the like are used herein to refer to copolymers of ethylene with one or more comonomers selected from $C_4$ to $C_{10}$ alpha oleofins such as butene-1, octene, etc. in which the molecules of the copolymers comprise long chains with few side chain branches or cross-linked structures. This molecular structure is to be contrasted with conventional low or medium density polyethylenes which are more highly branched than their respective counterparts.

"LLDPE" as defined herein has a density usually in the range of from about 0.916 grams per cubic centimeter to about 0.925 grams per cubic centimeter.

The terms "linear medium density polyethylene", "LMDPE" and the like as used herein refers to copolymers as described above and having a density usually in a range of from about 0.926 grams per cubic centimeter to about 0.941 grams per cubic centimeter.

The terms "ethylene vinyl acetate copolymer", "EVA" and the like is used herein to refer to a copolymer formed from ethylene and vinyl acetate monomers wherein the ethylene derived units in the copolymer are present in major amounts, preferably between about 60% and 98% by weight, and the vinyl acetate derived units in the copolymer are present in minor amounts, preferably between about 2% and 40% by weight.

The term "oriented" and the like is used herein to define a material which, when heated to an appropriate temperature above room temperature (for example 96° C.), will have free shrink of 5% or greater in at least one linear direction.

All compositional percentages used herein are calculated on a "by weight" basis.

The term "polyamide" and the like refers to high molecular weight polymers having amide linkages along the molecular chain, and refers more specifically to synthetic polyamide such as various nylons.

BRIEF DESCRIPTIONS OF THE DRAWINGS

Further details are given below with reference to the sole drawing FIGURE where FIG. 1 is a schematic cross-section of a preferred embodiment of a multilayer film of the invention.

DESCRIPTIONS OF THE PREFERRED EMBODIMENTS

Referring specifically to the drawings, in FIG. 1, a schematic cross-section of the preferred embodiment of the coextruded multilayer oriented film of the invention is shown. Film structure is directed to a multilayer film having the generalized structure of A/B/C/B/A where A is an outer layer, B is an intermediate adhesive layer, and C is a core layer containing a blend of a barrier material and a polyamide. Preferably, the outer layers A each comprise about 35% of the total multilayer film thickness; the intermediate layers B each comprise about 10% of the film thickness, and the barrier/polyamide layer C about 10% of the total film thickness. The total thickness of the multilayer film is preferably between about 0.5 and 2.0 mils, and more preferably between 0.75 and 1.5 mils. Even more preferably, the multilayer film of the present invention is about 1 mil thick.

Preferably, core layer 10 is a blend of ethylene vinyl alcohol copolymer and a polyamide or copolymer comprising polyamide comonomers. Core layer 10 preferably forms between about 5% and 25% of the total film thickness. Thicknesses less than about 5% result in a very thin film with possible voids in the barrier material. Thicknesses greater than about 25% make the film difficult to stretch or rack, and also result in increased cost due to the expensive barrier component.

Intermediate layers 12 and 14 are preferably acid or acid anhydride-modified polymeric material which can bond the core layer 10 to the outer layers 16 and 18. This material preferably includes a graft copolymer of a polyolefin, such as polyethylene, or ethylene-ester copolymer substrate and an unsaturated carboxylic acid or acid anhydride, blended with a polyolefin, such as polyethylene, or ethylene-ester copolymer.

Outer layers 16 and 18 are preferably a three component blend of LLDPE, LMDPE, and EVA. These outer layers preferably include from about 40% to about 60% by weight of LLDPE, from about 20% to about 30% by weight of LMDPE, and from about 20% to about 30% by weight of EVA. More preferably, the outer layers 16 and 18 include about 50%, by weight, of a LLDPE, about 25%, by weight, of LMDPE, and about 25%, by weight, of EVA.

The EVA has a vinyl acetate (VA) content of preferably between about 3.5 and 9% by weight and more preferably between about 3.5 and 5% by weight. At VA contents greater than about 9%, the multilayer film becomes too sticky or tacky for many applications, or requires the use of relatively large amounts of slip and anit-block additives.

The film is preferably irradiated with between about 3 and 13 megarads (M.R.) of irradiation, even more preferably between about 5 and 10 M.R., prior to orientation of the film. Orientation is done by racking or stretching the film at a racking ratio of from between about 3.0 and about 5.0 times the original dimensions of the film in the longitudinal (machine) and transverse directions.

EXAMPLE 1

A sample film was prepared by blending 50% of LLDPE (Dowlex 2045), 25% LMDPE (Dowlex 2037) and 15% EVA having a vinyl acetate of about 3.6%, blended with about 10% of a masterbatch concentrate containing slip and antiblock additives compounded with EVA of about 3½% vinyl acetate content by weight. This outside blend layer was coextruded with a core layer containing a blend of 90% EVOH (EVAL H) and 10% of a nylon 6/nylon 12 copolymer (Grillon CA-6), and an intermediate adhesive (Norchem Plexar 3150).

The Dowlex 2045 may be obtained from Dow Chemical Company. This is an especially preferred LLDPE for use in this invention, and is a copolymer of ethylene and octene and has a density of 23° C. of about 0.920 grams per cubic centimeter and a melt flow index of from about 0.7 to about 1.2 grams per ten minutes (as measured by ASTM-D-1238, E-28). LLDPE adds toughness to the film.

A preferred LMDPE is Dowlex 2037, also obtainable from Dow Chemical Company. This resin is a copolymer of ethylene and octene and has a density at 23° C. of about 0.935 grams per cubic centimeter and a melt flow index of about 2.55 grams per ten minutes (ASTM-D-1238, E-28). The LMDPE imparts stiffness, i.e. high modulus, to the film without significantly sacrificing toughness. The high modulus characteristic of the film is especially desirable in form-fill-seal applications where the film is fed as a lay-flat film and then formed on a forming shoe into a tube.

The EVA of the outside blend layer is commercially available from El Paso Polyolefins Company under the trade designation El Paso PE 204-CS95. This material has a density at 23° C. of from about 0.9232 to about 0.9250 grams per cubic centimeter and a melt flow (ASTM-D-1238, E-28) of about 2.0±0.5 grams per ten (10) minutes. The vinyl acetate content of this EVA is about 3.6% by weight.

EVA improves the processability of the film, and also provides a sealing layer which can be adequately sealed at relatively low temperatures, or else provides a stronger seal at a given temperature, than many other polymeric resins.

The EVOH of the core blend layer was EVAL H, available from EVAL Company of America and having the ethylene content of about 38% by weight and a melt index of about 1.5 grams/10 minutes. Other suitable EVOH resins include EVAL E, EVAL F, and EVAL K, as well as blends of the above, and preferably such resins or blends having a melt index of between about 1 to 4 grams per ten minutes (ASTM 1238). Grillon CA-6, available from Emser Industries, was blended with the EVOH. The Grillon CA-6 is a nylon copolymer having about 60% nylon 6 and about 40% nylon 12 by weight.

Although nylon 12 would be effective alone as a blending material in the core layer, this is a relatively expensive material. Nylon 6 alone would be effective as a blending material, but with some difficulty in processing. The particular blend employed proved to be very advantageous in providing an economical yet effective means for providing a core blend having the good barrier properties associated with EVOH, but with the processing and elongation advantages of nylon. Another suitable nylon copolymer is Grillon CR-9, having 20–30% nylon 6 and 70–80% nylon 12 by weight.

The intermediate adhesive material, Norchem Plexar 3150, is a low density polyethylene-based anhydride-modified resin produced by Norchem. Other anhydride-modified adhesives such as CXA-162 (duPont) can also be used as the intermediate adhesive.

The polymer belt from the coextrusion die was then cooled and cast into a solid tape which was irradiated with about 8 megarads of irradiation. The tape was then heated to about 110° C. in an oven and blown into a bubble. The bubble was expanded to about 3.5 times its original dimensions in both the machine (longitudinal) and transverse directions, and then deflated and ply separated into single wound film rolls. The final film had a thickness of about one mil, and in addition to the shrink properties imparted by orientation, exhibited excellent toughness, good optics, burn out resistance, resistance to tear propagation, and heat sealability. The film also exhibited good abuse resistance and the necessary stiffness and lower tack required for packaging applications and was substantially free of voids in the EVOH/polyamide blend layer.

Test results for the sample film are listed below in Table I.

TABLE I

| Tensile at Break and 73° F. (PSI)[1] | |
| --- | --- |
| Avg.[2] Longitudinal | 1151.0 × 100 |
| Std. Dev | 82.3 × 100 |
| 95% C.L.[3] | 130.9 × 100 |
| Avg. Transverse | 887.5 × 100 |
| Std. Dev. | 25.4 × 100 |
| 95% C.L. | 40.4 × 100 |
| Elongation at Break and 73° F. (%)[4] | |
| Avg. Longitudinal | 86. |
| Std. Dev. | 6. |
| 95% C.L. | 9. |
| Avg. Transverse | 151. |
| Std. Dev. | 21. |
| 95% C.L. | 33. |
| Modulus at 73° F. (PSI)[5] | |
| Avg. Longitudinal | 89.7 × 1000 |
| Std. Dev. | 3.2 × 1000 |
| 95% C.L. | 5.2 × 1000 |
| Avg. Transverse | 81.6 × 1000 |
| Std. Dev. | 4.5 × 1000 |
| 95% C.L. | 7.2 × 1000 |
| Tear Propagation at 73° F. (grams)[6] | |
| Avg. Longitudinal | 13.44 |
| Std. Dev. | 1.45 |
| 95% C.L. | 2.31 |
| Avg. Transverse | 19.25 |
| Std. Dev. | 3.30 |
| 95% C.L. | 5.26 |
| Free Shrink (%) at 220° F.[7] | |
| Avg. Longitudinal | 22. |
| Std. Dev. | 1. |
| 95% C.L. | 2. |
| Avg. Transverse | 33. |
| Std. Dev. | 1. |
| 95% C.L. | 1. |
| Free Shrink at 240° F. | |
| Avg. Longitudinal | 66. |

TABLE I-continued

| | |
|---|---|
| Std. Dev. | 1. |
| 95% C.L. | 1. |
| Avg. Transverse | 64. |
| Std. Dev. | 1. |
| 95% C.L. | 2. |
| Free Shrink at 260° F. | |
| Avg. Longitudinal | 69. |
| Std. Dev. | 0. |
| 95% C.L. | 0. |
| Avg. Long. | 64. |
| Std. Dev. | 1. |
| 95% C.L. | 1. |
| Shrink Properties at 220° F. | |
| Shrink Force (lbs)[8] | |
| Avg. Longitudinal | 0.439 |
| Std. Dev. | 0.013 |
| 95% C.L. | 0.021 |
| Avg. Transverse | 0.533 |
| Std. Dev. | 0.015 |
| 95% C.L. | 0.024 |
| Shrink Tension (PSI)[9] | |
| Avg. Longitudinal | 374. |
| Std. Dev. | 22. |
| 95% C.L. | 35. |
| Avg. Transverse | 434. |
| Std. Dev. | 15. |
| 95% C.L. | 23. |
| Shrink Properties at 240° F. | |
| Shrink Force (lbs.) | |
| Avg. Longitudinal | 0.459 |
| Std. Dev. | 0.013 |
| 95% C.L. | 0.021 |
| Avg. Transverse | 0.500 |
| Std. Dev. | 0.014 |
| 95% C.L. | 0.022 |
| Shrink Tension (PSI) | |
| Avg. Longitudinal | 389. |
| Std. Dev. | 11. |
| 95% C.L. | 18. |
| Avg. Transverse | 414. |
| Std. Dev. | 14. |
| 95% C.L. | 22. |
| Shrink Properties at 260° F. | |
| Shrink Force (lbs) | |
| Avg. Longitudinal | 0.383 |
| Std. Dev. | 0.034 |
| 95% C.L. | 0.054 |
| Avg. Transverse | 0.509 |
| Std. Dev. | 0.037 |
| 95% C.L. | 0.059 |
| Shrink Tension (PSI) | |
| Avg. Longitudinal | 338. |
| Std. Dev. | 31. |
| 95% C.L. | 49. |
| Avg. Transverse | 457. |
| Std. Dev. | 29. |
| 95% C.L. | 46. |
| Optical Properties at 73° F. | |
| Haze (%)[10] | |
| Avg. | 2.9 |
| Std. Dev. | 0.2 |
| 95% C.L. | 0.4 |
| Clarity (%)[11] | |
| Avg. | 65.2 |
| Std. Dev. | 3.6 |
| 95% C.L. | 5.7 |
| Gloss (45°)[12] | |
| Avg. | 84. |
| Std. Dev. | 2. |
| 95% C.L. | 4. |
| Oxygen Transmission at 73° F., 0% RH[13] | |
| Sample 1 | 7.3 |
| Sample 2 | 7.6 |
| Sample 3 | 7.8 |

The following footnotes apply to Table I.
[1] ASTM D882-81.
[2] All values in Table I are averages obtained from four (4) replicate measurements.
[3] C.L. is Confidence Limit - e.g., if the reported average value was 10 and the 95% C.L. was 2, then if one hundred replicate readings were made, 95 of them would have a value between 8 and 12, inclusive.
[4] ASTM D-882-81.
[5] ASTM D-882-81.
[6] ASTM D-1938-79.
[7] ASTM D-2732-70 (reapproved 1976).
[8] ASTM D-2838-81 (shrink free = shrink tension × film thickness in mils × 1000)
[9] ASTM D-2838-81
[10] ASTM D-1003-61 (reapproved 1977)
[11] ASTM D-1746-70
[12] ASTM D-2457-70 (reapproved 1977)

EXAMPLE 2

A sample film was prepared according to the same procedure and formulation described in Example 1, having Plexar 158 as an intermediate adhesive layer, but without a polyamide in the core layer. This film exhibited voids in the EVOH layer. Processed meat (bologna) packaged in the film was found to discolor at regions adjacent the void areas of the EVOH core layer.

Obvious modifications to the invention as described may be made by one skilled in the art without departing from the spirit and scope of the claims as presented below.

What is claimed is:

1. An oriented multilayer film comprising:
   (a) a cross-linked core layer comprising a blend of an ethylene vinyl alcohol copolymer and a polyamide resin, said blend forming between about 5% and 25% of the total film thickness;
   (b) two cross-linked interior layers each comprising an adhesive resin;
   (c) two cross-linked outer layers each comprising a three-component blend of a linear low density polyethylene, a linear medium density polyethylene, and an ethylene vinyl acetate copolymer; and
   (d) said film having a total thickness ranging from about 0.75 to 1.5 mils.

2. An oriented five-layer film comprising:
   (a) a cross-linked core layer comprising a blend of (1) from about 80%, by weight, to about 99%, by weight, of an ethylene vinyl alcohol copolymer and (2) from about 1%, by weight, to about 20%, by weight of a polyamide resin, said blend forming between about 5% and 25% of the total film thickness;
   (b) two cross-linked interior layers each comprising an adhesive resin;
   (c) two cross-linked surface layers each comprising a blend of (1) from about 40%, by weight, to about 60%, by weight, of a linear low density polyethylene, (2) from about 20%, by weight, to about 30%, by weight of a linear medium density polyethylene, and (3) from about 20%, by weight, to about 30%, by weight, of an ethylene vinyl acetate copolymer; and
   (d) said film having a total thickness ranging from about 0.75 to 1.5 mils.

3. An oriented five-layer film comprising:
   (a) a cross-linked core layer comprising a blend of (1) about 90%, by weight, of an ethylene vinyl alcohol copolymer, and (2) about 10%, by weight, of a polyamide resin, said blend forming between about 5% and 25% of the total film thickness;

(b) two cross-linked interior layers each comprising an acid or acid anhydride-modified polymeric material;

(c) two cross-linked surface layers each comprising a blend of (1) about 50% by weight, of a linear low density polyethylene, (2) about 25%, by weight, of a linear medium density polyethylene and (3) about 25%, by weight, of an ethylene vinyl acetate copolymer; and (d) said film having a total thickness ranging from about 0.75 to 1.5 mils.

4. The film of claims 1, 2 or 3 wherein said ethylene vinyl acetate copolymer comprises from about 3.5%, by weight, to about 9%, by weight, of vinyl acetate derived units.

5. The film of claims 1, 2, or 3 wherein said ethylene vinyl acetate copolymer comprises from about 3.5%, by weight, to about 5%, by weight, of vinyl acetate derived units.

6. The film of claims 1, 2, or 3 wherein said ethylene vinyl acetate copolymer comprises from about 3.6%, by weight, of vinyl acetate derived units.

7. The film of claims 1, 2 or 3 which has been cross-linked with from about three megarads to about thirteen megarads of irradiation.

8. The film of claims 1, 2 or 3 which has been cross-linked with from about five megarads to about ten megarads of irradiation.

9. The film of claims 1, 2 or 3 which has been cross-linked with about eight megarads of irradiation.

10. The film of claims 1, 2 or 3 which has been oriented by racking at a racking ratio of from about 3.0 to about 5.0 in both the longitudinal and transverse directions.

11. The film of claims 1, 2 or 3 which has been oriented by racking at a racking ratio of about 3.5 in both the longitudinal and transverse directions.

12. A method of making an oriented multilayer barrier film having a total thickness ranging from about 0.75 to 1.5 mils comprising:

(a) simultaneously coextruding a core layer of a blend of an ethylene vinyl alcohol copolymer and a polyamide resin, two intermediate layers of an adhesive material, and two outer layers of a blend of a linear low density polyethylene, a linear medium density polyethylene, and an ethylene vinyl acetate copolymer;

(b) rapidly cooling the coextruded film;

(c) collapsing the cooled film;

(d) irradiating the cooled film with between about 3 and 13 megarads of irradiation;

(e) heating the irradiated film to a temperature between about 105° C. and 115° C.; and (f) stretching and orienting the heated film.

13. The method of claim 12 wherein the coextruded film is cooled to about room temperature.

14. The method according to claim 12 wherein the heated film is oriented by racking at a racking ratio of from about 3.0 to about 5.0 in both the longitudinal and transverse directions.

15. The method according to claim 12 wherein the heated film is oriented by racking at a racking ratio of about 3.5 in both longitudinal and transverse directions.

16. The method according to claim 12 further comprising the step of reheating the oriented film to a temperature near its orientation temperature to provide a substantially non-shrinkable film.

* * * * *